N. CLARK.
DISH-WARMER.

No. 187,511. Patented Feb. 20, 1877.

WITNESSES:
A.W. Almqvist
J.H. Scarborough

INVENTOR:
N. Clark.
BY
Munn
ATTORNEYS.

UNITED STATES PATENT OFFICE.

NATHAN CLARK, OF NEW YORK, N. Y.

IMPROVEMENT IN DISH-WARMERS.

Specification forming part of Letters Patent No. 187,511, dated February 20, 1877; application filed January 29, 1877.

*To all whom it may concern:*

Figure 1:
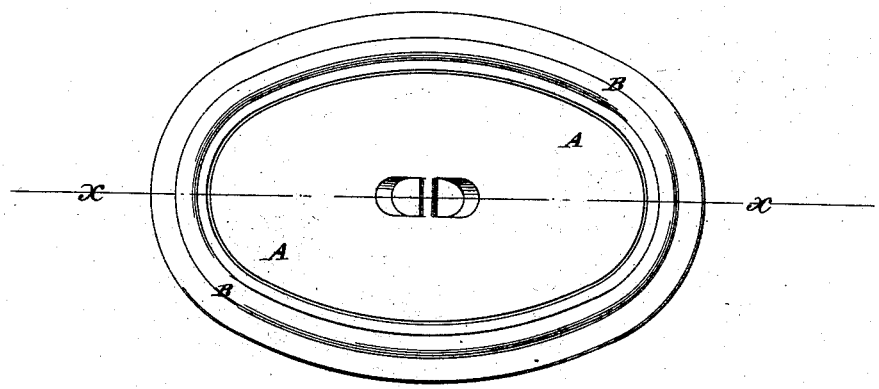
Figure 2:
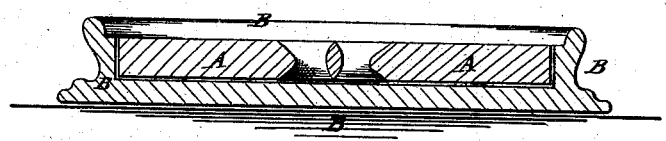

Be it known that I, NATHAN CLARK, of the city, county, and State of New York, have invented a new and useful Improvement in Dish-Warmer, of which the following is a specification:

Figure 1 is a top view of my improved dish-warmer. Fig. 2 is a longitudinal section of the same, taken through the line $x\,x$, Fig. 1.

Similar letters of reference indicate corresponding parts.

The object of this invention is to furnish an improved device for keeping platters and other dishes warm after being placed upon the table, and which shall be simple in construction, effective and convenient in use, and neat in appearance.

The invention consists in an improved dish-warmer, formed of the iron plate and the wooden holder, to adapt the device to be placed upon a table to hold a dish, as hereinafter fully described.

A represents an iron plate, of any desired size and thickness, and which may be oval, circular, or of any other desired form, according to the form of the dish to be placed upon it. In the center of the plate A is a hole, to enable it to be handled with an ordinary stove-cover lifter. B is a holder, which is made of wood, and with a cavity upon its upper side, of such a size that the iron plate A may fit into it. The flange of the holder B should rise a little above the iron plate A to prevent the dish from slipping off. The holder B may be ornamented as may be desired, and may be painted or left of its natural color.

In using the device, the iron plate A is warmed to the desired temperature by being placed upon the stove or range, and is then placed in the holder B, and the dish to be kept warm is placed upon it, and it is then placed upon the table. In this way the dish and its contents will be kept hot for a long time.

Having thus described my invention, I claim as new and desire to secure by Letters Patent—

An improved dish-warmer, formed of the iron plate A, and the wooden holder B, to adapt the device to be placed upon a table to hold a dish, substantially as herein shown and described.

NATHAN CLARK.

Witnesses:
 JAMES T. GRAHAM,
 C. SEDGWICK.